United States Patent [19]

Galloway

[11] Patent Number: 4,497,440
[45] Date of Patent: Feb. 5, 1985

[54] NON-DRAIN VALVE FOR SPRINKLER SYSTEMS

[75] Inventor: Cecil Galloway, Glendora, Calif.

[73] Assignee: Brownline Pipe Inc., Pomona, Calif.

[21] Appl. No.: 433,241

[22] Filed: Oct. 7, 1982

[51] Int. Cl.³ .............................................. B05B 1/30
[52] U.S. Cl. .................................. 239/201; 137/509; 239/207; 239/570
[58] Field of Search ............... 239/450, 452, 570, 200, 239/201, 207, 451, 456, 459; 137/509

[56] References Cited

U.S. PATENT DOCUMENTS

| | | | |
|---|---|---|---|
| 1,122,008 | 12/1914 | Kramer. | |
| 2,083,695 | 6/1937 | Dull | 102/5 |
| 2,335,829 | 11/1943 | McBride | 277/70 |
| 2,664,106 | 12/1953 | Livers | 137/643 |
| 2,675,021 | 4/1954 | Allin | 137/536 |
| 2,731,981 | 1/1956 | Glasser | 137/536 |
| 2,770,498 | 11/1956 | Filliung et al. | 239/452 X |
| 2,886,058 | 5/1959 | Horton | 137/484.2 |
| 2,922,434 | 1/1960 | Prybylski et al. | 137/509 X |
| 2,977,980 | 4/1961 | Scholin | 137/538 |
| 3,149,643 | 9/1964 | Breitsprecher | 137/469 |
| 3,580,274 | 5/1971 | Hansen | 137/493 |
| 3,948,285 | 4/1976 | Flynn | 239/570 X |
| 4,000,684 | 1/1977 | Ruffley | 91/447 |
| 4,131,235 | 12/1978 | Lieding | 239/570 X |
| 4,172,468 | 10/1979 | Ruus | 137/504 |

*Primary Examiner*—Andres Kashnikow
*Attorney, Agent, or Firm*—Gausewitz, Carr, Rothenberg & Edwards

[57] ABSTRACT

A sprinkler system for plants and schrubs growing on the side of a hill has non-drain valves connected at discharge heads that are positioned at elevations below the main control valve for the system. The non-drain valves are opened by pressure of water exerted when the main control valve is opened. After the main control valve is closed and water pressure in the pipe system that feeds the discharge heads falls to a selected value, the non-drain valves automatically close, thereby preventing drainage from the discharge heads of water retained in the pipe system between the relatively low discharge heads and the relatively high control valve.

8 Claims, 4 Drawing Figures

NON-DRAIN VALVE FOR SPRINKLER SYSTEMS

BACKGROUND OF THE INVENTION

Sprinkler systems for watering lawns, schrubs, and other plants on sloping terrain are often arranged so that a main control valve for a number of water discharge heads is most conveniently positioned at an elevation that is above one or more of the discharge heads. A pipe system runs along and down the slope, interconnecting the control valve and discharge heads. In exceedingly steep terrain, or for plantings on the side of steep embankments, for example, a control valve at the top of the embankment may be many feet above a discharge head positioned near the foot of the slope. Accordingly, when the main control valve is shut off and water can no longer flow through the valve into the pipe system, the pipe system itself, at least for a short time, is still filled with water. Much of this pipe system, which connects the main control valve with all of the discharge heads, may be at an elevation considerably above that of some of the sprinkler heads. Accordingly, for a time immediately after the control valve shuts off the water supply, water in the pipe system continues to flow from the sprinkler heads. This water is under greatly decreased pressure and cannot be forcefully discharged to any useful distance from the sprinkler head, as is the case in normal operation of the discharge head with full water pressure from the open control valve. Because of the reduced pressure, water that drains from the pipe system to and through the discharge heads after shutoff of the control valve, collects at the foot of the risers supporting the respective discharge heads. This continued drain after main valve shutoff is undesired for a number of reasons: it is unsightly, it may collect in a pool of standing water (which itself can cause problems), and, in some cases, may continue to flow down portions of the slope with consequent tendencies toward errosion.

Accordingly, it is an object of the present invention to provide a sprinkler system that avoids or minimizes such problems.

SUMMARY OF THE INVENTION

In carrying out principles of the present invention in accordance with a preferred embodiment thereof, a sprinkler system comprising a plurality of water discharge heads interconnected by a pipe system with a main valve at an elevation above at least some of the discharge heads has a non-drain valve positioned at at least one of the discharge heads. The non-drain valve includes a body having a plunger chamber and a valve seat. A hollow valve plunger is slidably mounted in the chamber and has an end closure cooperating with a seat to close the valve outlet. The plunger has an enlarged piston slidably sealed to walls of the chamber and ports that connect the interior of the plunger with the chamber downstream of the piston. The upstream side of the piston is ported to atmosphere, and means are provided to urge the plunger end closure toward the valve seat to close the non-drain valve. Accordingly, when water in the pipes is at or above a predetermined pressure, the valve closure is driven from the valve seat to open position to permit flow of water, and when the control valve is operated to turn off water flow and water pressure in the pipes decreases to a predetermined pressure, the non-drain valve is closed.

DETAILED DESCRIPTION OF THE INVENTION

Figure 1:
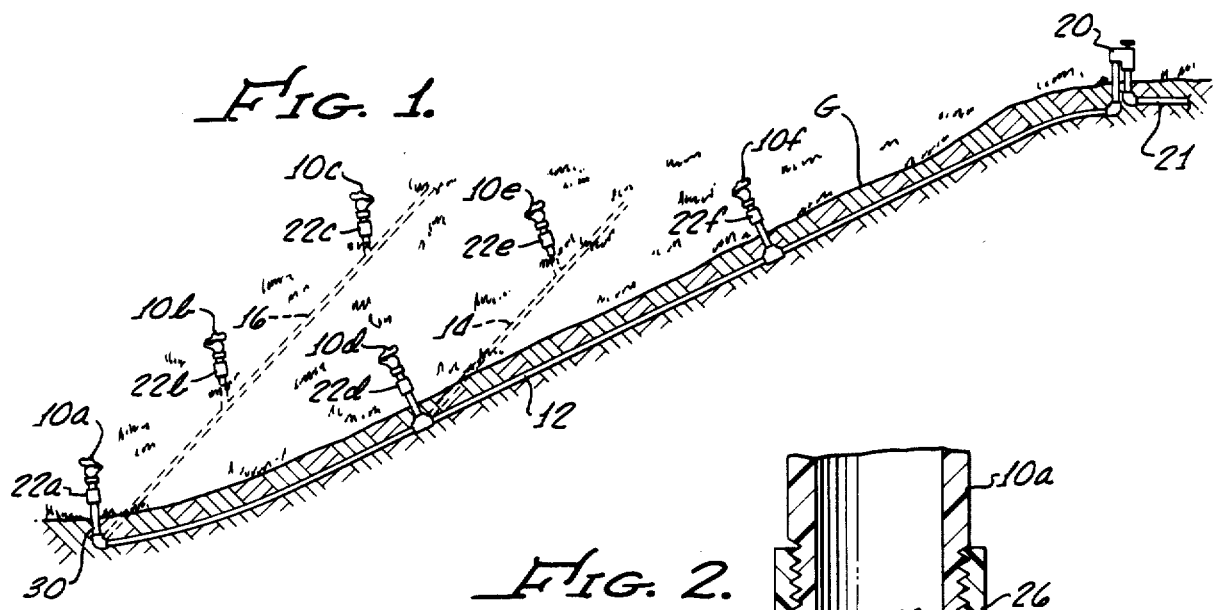
FIG. 1 schematically illustrates an exemplary hillside sprinkler installation.

As shown in FIG. 1, a sprinkler system, which is merely exemplary of many different types of installations and arrangements for irregular and sloping terrain, employs a number of sprinkler heads 10a through 10f positioned at selected locations along the side of a slope G and all interconnected by a system of pipes including those designated 12, 14, 16. The pipe system extends along the side of the slope and also extends upwardly to a point at or near the top of the slope, or at least to a point considerably above one or more of the sprinkler heads, to a main control valve 20. The latter may be operated manually, by an automatic timer, or by remote control, to turn on or off flow of water from a pressurized water supply line 21 to the pipe system 12, 14, 16 and thereby to the sprinkler discharge heads 10a through 10f. When the control valve 20 is operated to closed condition and water can no longer flow from the pressurized water supply into the pipe system, the latter initially is still filled with water. The pipe system and sprinkler heads controlled by a single control valve may extend for long distances, and moreover, much of this pipe system may be positioned at elevations considerably above the lowermost sprinkler heads. Therefore, a large quantity of water tends to drain from the discharge heads, trickling out at relatively low pressure.

In the exemplary installation shown in FIG. 1, immediately after shutoff of the control valve water may be present in the pipe system above even the uppermost sprinkler head 10f. A considerably greater amount of water remains in the pipe system above the lowermost sprinkler heads 10a, 10b and 10c. Water remaining in the pipe system, after shutoff of the control valve, flows by gravity to the discharge heads and will drain slowly therefrom (assuming absence of non-drain valves to be described below). This drainage contines until there no longer is any water within the pipe system above the lowermost sprinkler heads. The water that drains from the sprinkler heads after control valve shutoff is a under a considerably lower pressure than the pressure of the main supply (which is provided to the sprinkler heads when the valve 20 is open), so that water draining from the discharge valves under gravity is not discharged at a distance from the heads, as in normal operation of the heads. It merely trickles from the discharge heads to collect at or about the risers or to run in small streams down the slope. The water that merely drains from and is not forcefully discharged, may be of little benefit to the plants, and, accordingly, may be considered to be wasted.

To avoid the wasted drainage that occurs after shutoff of the control valve, each of the sprinkler heads that is positioned below the control valve is provided with a non-drain valve connected at its input. Thus, each of discharge heads 10a through 10f is provided with a non-drain valve 22a through 22f, respectively, connected in the flow path between the end of the riser upon which the discharge head is mounted and the inlet of the discharge head itself.

Figure 2:
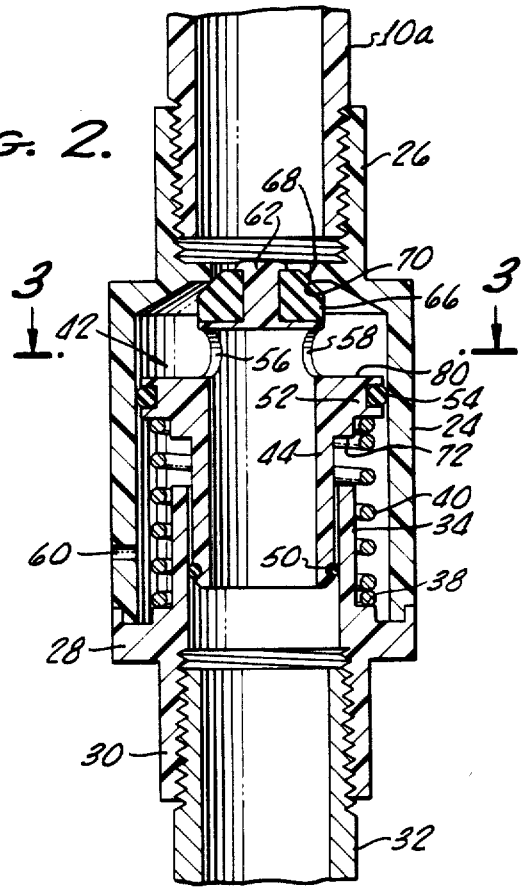
FIG. 2 is a longitudinal sectional view of a non-drain valve that may be employed in the system of FIG. 1.

Illustrated in FIG. 2 is a longitudinal cross-section of a typical one of the non-drain valves, such as valve 22a, all of the non-drain valves being substantially identical. The non-drain valve includes a tubular upper body case 24 having an internally threaded outlet 26 adapted to be threaded upon the externally threaded stem of the discharge head 10a. The open end of the cylindrical upper body case interfits with and is closed and sealed by a bottom retainer guide and inlet 28 having an internally threaded inlet stem 30 that is threadedly connected with a riser 32 of the pipe system.

Bottom retainer guide inlet 28 is formed with a tubular plunger guide sleeve 34 that extends axially of the upper body case and is spaced radially inwardly of the case walls. At the lower end of the exterior of the guide sleeve is a stepped shoulder 38 that forms a seat for a compression spring 40 circumscribing the guide sleeve between the sleeve and the interior case walls. A hollow valve plunger 42 has a lower stem portion 44 that is slidably and guidedly received within guide sleeve 34 and slidably sealed thereto by means of an O-ring 50. An intermediate portion of the plunger 42 is radially enlarged to provide a piston 52 having a circumferential groove that receives an O-ring 54 in slidable sealing engagement with the interior walls of the upper body case. A pair of diametrically opposed ports 56, 58 connect the interior of the hollow plunger with the interior of the upper body case at a point upstream of (below) the plunger piston 52. The downstream (upper) end of the plunger 52 forms a seat for the other end of spring 40 which, accordingly, urges the plunger to a valve closed position, toward the discharge head 10a. An aperture 60 connects the interior chamber of the upper body case at the upstream side of the piston with ambient atmosphere.

Plunger 42 includes a reduced diameter, forwardly extending shaft 62, positioned downstream of the ports 56, 58, upon which is securely mounted an end closure washer 66 having a forwardly tapered conical sealing surface 68.

The outlet of the valve is formed with a valve seat in the form of a radially inwardly projecting apertured ring having a sealing edge 70 that cooperates with the conical surface of washer 66 to close the valve.

All parts of the non-drain valve are preferably made of a suitable plastic, conveniently injection molded (except for washer 66). The upper body case may be made as a single section, the bottom retainer guide and inlet, including guide sleeve 34, may be molded as a second integral section. After assembly of the integrally molded plunger with its washer and spring to and within the upper body case, the bottom retainer guide and inlet may be connected as by adhesive, sonic welding, or the like, to provide a water-tight selaed joint that seals the interior valve chamber with the plunger spring and washer therein. A reduced diameter upstream portion of the piston 52 provides a surface 72 that cooperates with the upper end of the guide sleeve 34 to limit motion of the plunger from the illustrated valve closed position. Spring 40 is fully protected from the flowing water, as it is completely enclosed in the sealed (except to atmosphere), annular, cylindrical space between the case walls and the sleeve and plunger.

Spring 40 holds the non-drain valve in normally closed position with the plunger in its upward position, as illustrated in FIG. 2, with the conical surface of the washer pressed against the edge of the valve seat. When control valve 20 is opened and water from the pressurized supply is admitted via riser 32 and the interior of the plunger through ports 56, 58 to the chamber of the upper body case, pressure is exerted upon the downstream face 80 of the piston to provide a force that overcomes the combination of pressure on the upstream facing surfaces of the plunger and the compressive force of spring 40 to drive the plunger to open position and to permit water to flow from the riser through the non-drain valve into the discharge head at high pressure.

Upon shutoff of control valve 20, pressure of water in the pipe stream suddenly drops, and when the pressure of the water drops to a value such that the water pressuure net force exerted upon the plunger annd its piston is no longer greater than the compressive force of the spring, the plunger is driven by the spring to closed position, as illustrated in FIG. 2. Venting of the chamber below the piston 80 by means of aperture 60 prevents trapped air from resisting opening motion of the valve plunger.

It may be noted that when the control valve 20 is turned off, there is a sudden release of pressure from the pressurized supply. However, with regard to a discharge head (such as discharge head 22a, for example) at a lowermost point of the pipe system, there may still be some water pressure exerted. This is due to the head of water caused by the difference in elevation between upper portions of the pipe system and the discharge head. As long as the pipe system is filled or partially filled with water, there is a pressure of water at the discharge head, even though the valve 20 has been closed. Accordingly, the parameters of the valve, including the strength of the spring 40 and the area differential between downstream and upstream sides of the piston and plunger, are chosen so that the plunger will remain in its closed position when the water pressure is somewhat above the water pressure that is due to the difference in elevation between an uppermost portion of the pipe system and the lowermost discharge head 10a. In other words, when the main valve 20 is turned off, the water pressure at discharge head 10a may drop from a supply pressure, which may be noted by S, to a pressure due to the head of water in the elevated pipe, which may be noted by H, where the pressure H, of course, is considerably less than the pressure S. The non-drain valve is arranged so that it will close when the pressure of water provided at its inlet decreases below the high pressure S to a value intermediate S and H, but preferably considerably above H. This will ensure that the non-drain valve will not be opened by water pressure due only to the elevation difference between the control valve and a discharge head. When the main valve is turned off, pressure in the pipe system drops to the selected non-drain valve closing valve much more rapidly than water can drain from the pipe system. Accordingly, water in the pipe system at main valve closing remains, with very little draining before the non-drain valve also closes.

When valve 20 is turned on, water pressure within the pipe system rapidly rises from a valve below the pressure needed to open the non-drain valve to a much higher pressure. Accordingly, the valve will open almost instantaneously, and, moreover, water that had been retained within the pipe system by operation of the non-drain valves after the previous closure of the main control valve 20, will be immediately discharged under the high pressure desired for optimum watering. Thus, the water that is retained in the pipe system after shufoff never merely drains from the discharge heads, but upon the next opening of main control valve, this retained water is forcefully discharged by the heads, as designed, and waste of water is minimized.

Figure 4:
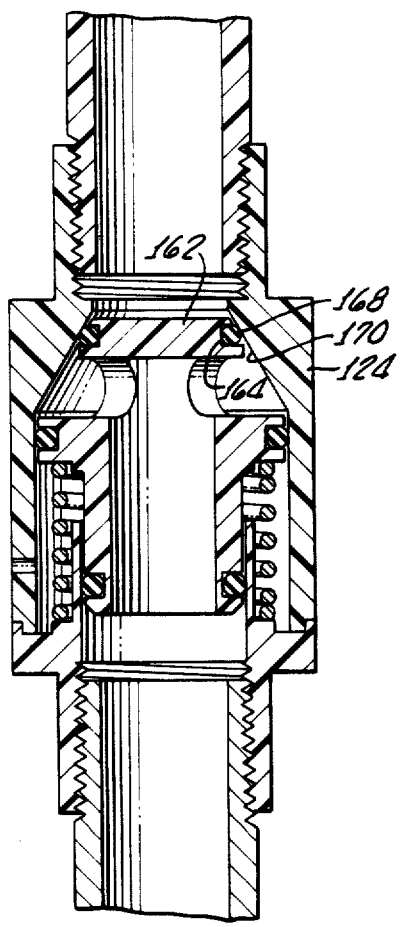
FIG. 4 is a longitudinal sectional view of a modified non-drain valve.
Figure 3:
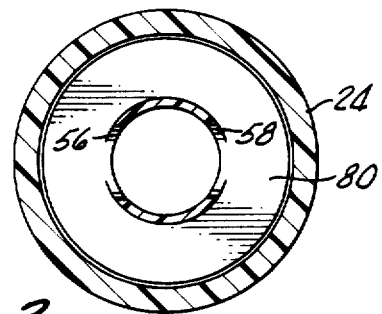
FIG. 3 is a section taken on lines 3—3 of FIG. 2.

Illustrated in FIG. 4 is a modification of the non-drain valve of FIGS. 2 and 3. The valve of FIG. 4 is identical to the valve of FIGS. 2 and 3, except for the construction of the end closure. Upper body case 124 has an integral valve seat formed by a more shallow tapering conical surface 170. The plunger end closure is formed as a truncated, conical forward section 162 having a circumferential groove 164 in which is seated an O-ring 168 that cooperates with the conical valve seat surface 170 formed integraly with the upper body case 124. In all other respects, the non-drain valve of FIG. 4 is identical to and operates substantially in the same manner as the non-drain valve of FIGS. 2 and 3.

The foregoing detailed description is to be clearly understood as given by way of illustration and example only, the spirit and scope off this invention being limited solely by the appended claims.

What is claimed is:

1. A sprinkler system comprising
    a plurality of water discharge heads,
    a pipe system interconnecting said discharge heads with a pressurized water supply,
    a main valve for controlling flow of pressurized water from said supply through said pipe system to said discharge heads, said valve being positioned at an elevation above at least some of said discharge heads whereby water in said pipe system tends to drain from said discharge heads after said main valve is operated to stop flow of water from said water supply, and
    non-drain means for decreasing drainage from at least one of said discharge heads, said non-drain means comprising
        a non-drain valve body connected in said pipe system adjacent said one discharge head, said body having an inlet, an outlet, a plunger chamber between the inlet and outlet, and a valve seat adjacent said outlet,
        a hollow valve plunger slidably mounted in said chamber and having an end closure cooperating with said seat to close said outlet, said plunger having an enlarged piston slidably sealed to walls of said chamber, and having ports connecting the interior of said plunger with said chamber downstream of said piston,
        tubular guide sleeve fixed to said valve body, said sleeve extending axially in said chamber and spaced from said chamber walls, said plunger being slidably mounted within and sealed to said sleeve,
        an atmospheric port connecting the chamber upstream of said piston to atmosphere, and
        spring means for urging said plunger end closure toward said valve seat, said spring means being positioned between said sleeve and a wall of said chamber and extending between said piston and an end of said sleeve adjacent said inlet.

2. The system of claim 1 wherein said end closure includes a substantially cylindrical end extending forwardly from said piston and having a diameter less than the diameter of said piston and less than the diameter of said valve body chamber to form a passage circumscribing said end closure downstream of said piston, whereby a relatively larger downstream area of said piston is exposed to water pressure when said main valve permits flow from said supply.

3. The system of claim 2 wherein said cylindrical end includes a reduced diameter, forwardly extending shaft and a washer mounted on said shaft for cooperating with said valve seat to seal said outlet.

4. The system of claim 3 wherein said valve seat comprises a radially inwardly projecting apertured ring integral with said valve body, the aperture of said ring having a circumferential edge, said washer having a conical surface adapted to seat upon said circumferential edge.

5. The system of claim 1 wherein said cylindrical end includes a conical forward portion having a circumferential groove, an O-ring in said groove, said valve seat having a conical surface cooperating with said conical forward portion and said O-ring to seal said outlet.

6. The system of claim 1 wherein said plunger is formed with a shoulder facing upstream and wherein said guide sleeve has a downstream end cooperating with said shoulder to limit upstream displacemment of said plunger.

7. A non-drain valve for a discharge head of a sprinkler system wherein the discharge head is positioned below a remote water shutoff valve so that water tends to continue to drain from the discharge head after the shutoff valve is operated to shut off the water supply, said non-drain valve adapted to be positioned in a water line adjacent said discharge valve, said non-drain valve comprising
    a valve body having an inlet and outlet,
    an axially extending guide sleeve fixed to and within said body and radially spaced inwardly of said body, said sleeve having a spring shoulder formed at an upstream portion of the exterior thereof,
    a valve plunger having a plunger stem slidably mounted within said guide sleeve and sealed thereto,
        said plunger having a radially enlarged piston fixed to an intermediate portion thereof and slidably and sealingly engaged with the interior walls of said valve body, said piston having an upstream facing shoulder cooperating with a downstream end of said guide sleeve to limit motion of said valve plunger,
    a compression spring circumscribing said guide sleeve between said sleeve and said valve body, said sleeve being seated at an upstream end upon said guide sleeve shoulder and at a downstream end upon one side of said piston, said spring being confined and sealed within a spaced defined by said valve body, said guide sleeve and said piston and plunger stem, said space being vented to atmosphere,
        said plunger being hollow and having a forward stem extending forwardly of said piston, said forward stem having a plurality of apertures therein for providing communication between the interior of said plunger and the interior of said valve body downstream of said piston,
    said body having a valve seat adjacent said outlet facing said inlet, and
    a sealing washer mounted on said plunger forward end for cooperating with said valve seat to close said outlet when said water supply is shut off.

8. Non-drain valve means comprising a non-drain valve body having an inlet, an outlet, a plunger chamber between the inlet and outlet, and a valve seat adjacent said outlet,

- a hollow valve plunger slidably mounted in said chamber and having an end closure cooperating with said seat to close said outlet, said plunger having an enlarged piston slidably sealed to walls of said chamber, and having ports connecting the interior of said plunger with said chamber downstream of said piston,
- a tubular guide sleeve fixed to said valve body, said sleeve extending axially in said chamber and spaced from said chamber walls, said plunger being slidably mounted within and sealed to said sleeve,
- an atmospheric port connecting the chamber upstream of said piston to atmosphere, and
- spring means for urging said plunger end closure toward said valve seat, said spring means being positioned between said sleeve and a wall of said chamber and extending between said piston and an end of said sleeve adjacent said inlet.

* * * * *